Figure 1:
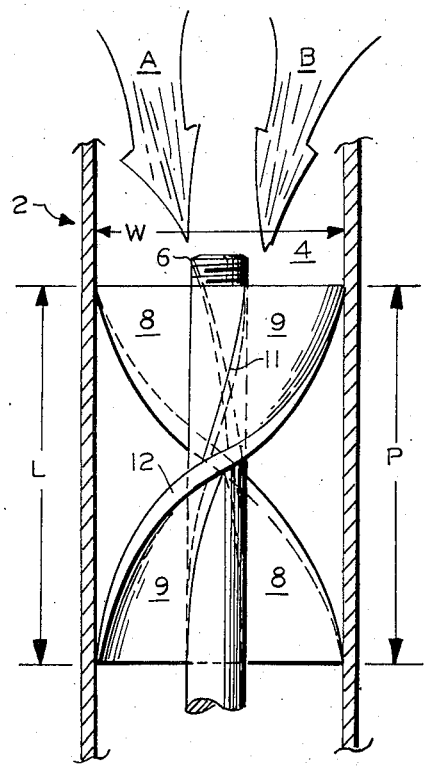

United States Patent [19]

Harder

[11] 3,794,300

[45] Feb. 26, 1974

[54] ANNULAR SPIRAL ISG

[75] Inventor: Richard E. Harder, Anderson, S.C.

[73] Assignee: Dow Badische Company, Williamsburg, Va.

[22] Filed: Dec. 30, 1971

[21] Appl. No.: 213,976

[52] U.S. Cl. ................................................ 259/4
[51] Int. Cl. .............................................. B01f 5/00
[58] Field of Search ............ 259/4, 18, 36; 239/399

[56] References Cited
UNITED STATES PATENTS

| | | | |
|---|---|---|---|
| 3,635,444 | 1/1972 | Potter | 259/4 |
| 3,190,618 | 6/1965 | Katzen | 259/4 |
| 3,424,437 | 1/1969 | Shearer | 259/4 |

FOREIGN PATENTS OR APPLICATIONS

| | | |
|---|---|---|
| 735,033 | France | 259/4 |

Primary Examiner—Harvey C. Hornsby
Assistant Examiner—Philip R. Coe

[57] ABSTRACT

A device for generating internal surfaces within a flowing mass in a tube wherein the tube contains mixer elements adapted to mix a plurality of discrete fluids; and wherein the mixer elements are mounted on a shaft which shaft extends along the direction of flow within the tube. The mixer elements have a pitch to length ratio of about 1. In a preferred form, the mixer elements are formed from twisted involute elements of equal length mounted on the same length of the inner shaft.

5 Claims, 2 Drawing Figures

PATENTED FEB 26 1974 3,794,300

INVENTOR
RICHARD E. HARDER

BY Plumley & Tyner
ATTORNEYS

ANNULAR SPIRAL ISG

DISCLOSURE

This invention relates to mixers having no movable parts. Such mixers are known in the art and generally comprise a conduit having spaced therein baffles or other devices known as interfacial surface generators. The advantage of these mixers is that they can make more efficient use of a given quantity of mixing power. Previously used mixing devices using rotating elements are generally inefficient, since they generate heat due to a shear produced in the mixing action and, thus, dissipate part of the power supplied. Moreover, such devices by reason of the generation of heat are totally unacceptable for mixing certain heat sensitive materials. Furthermore, the rate of power dissipation is practically linearly increased as the viscosity of elements to be mixed increases.

As a solution to these problems, the interfacial surface generator, ISG, has become an accepted and preferred device by the art, particularly the art dealing with viscous fluids; however, these devices are likewise used for gaseous materials and powdered materials.

It is frequently found, however, that when reactive materials are being mixed in an ISG, for example, a mixture of a polyisocyanate and a hydroxy containing polyester or polyether, that the required length of the mixer is so long (by reason of the required number of internal baffles to assure adequate mixing) that some polymerization and solidification occurs at the outlet end of the conduit. Such polymerized plastic tends to build up on the wall and this build-up increases the resistance to flow, thereby decreasing the efficiency of the static mixer. This results because the relationship of the length of the tube is directly proportional to the number of mixing elements positioned within the tube. The positioning of these elements is longitudinally along the tube, therefore, as a greater number is required to insure more thorough mixing the length of the tube naturally increases. The number of elements required for thorough mixing depends largely upon the nature of the materials to be mixed. When viscous and/or reactive materials are being handled, it is generally necessary to repeat the steps which result from the flow of liquid over baffles, and in such cases, the conduit may be viewed as a number of integral and identical units longitudinally attached to repeat the mixing which results from dividing, combining and redividing the flowing fluid.

In some cases very viscous fluids have a tendency to misalign or even break the mixer elements positioned in the tube. This results especially when the mixer elements are formed from plastic or from metals which are stretched greatly during formation. Such elements are typically formed from a ribbon of material that is helically twisted and therefore stressed and stretched, resulting in areas of weakness. Moreover, it is typical to secure the mixer elements by welding to the tube walls, an extremely difficult job, particularly within tubes so small that working inside is impossible, or by welding the elements together at contact points both of which eventually break, bend, or misalign during use.

This invention is adapted to provide a minimum length of tube containing structurally durable elements for adequate and thorough mixing of separate fluids without channeling and breaking. The shorter length of the mixing conduit results in corresponding reduction of the danger of solidification and build-up on the outlet portion of the conduit which again accordingly increases the efficiency of the static mixer in terms of the power consumed in mixing. Moreover, the invention is adapted for manufacture in a form which is structurally more durable.

This invention comprises an improvement over the prior art ISG's exemplified by French Pat. 735,033 and U.S. Pat. No. 3,286,992.

This invention eliminates use of weakened mixer elements by use of shortened, less stretched, mixer elements mounted on a central shaft, thereby also achieving a shortened overall length in the mixer. Essentially the invention is realized by mounting the spiral mixers on a closed shaft; when the elements are formed to fit onto a shaft they are shorter, less stretched, and have a pitch to length ratio of about 1:1.

The invention will be better understood by reference to the attached drawings which illustrate the static mixer of this invention.

Figure 2:
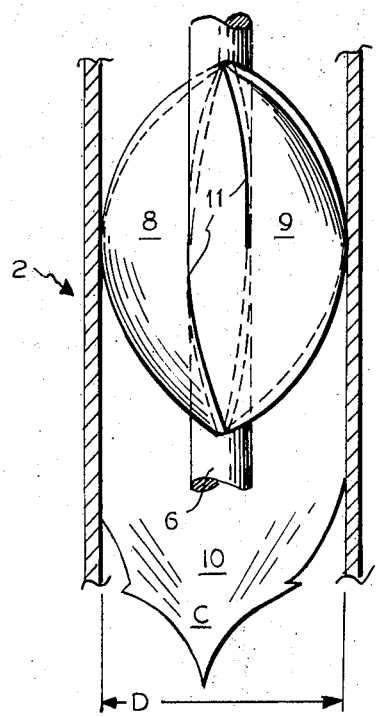

FIGS. 1 and 2 show the elements required to form mixer elements according to one preferred embodiment of this invention, both in elevation views.

In FIG. 1, 2 represents a tube according to this invention provided with an inlet 4 that receives and combines incoming separate streams A and B. The tube 2 is provided with a central shaft 6 which can be centered and threaded on its ends for support, as is customary in tubes adapted to contain centered rods. Mixing elements 8–9 are mounted on shaft 6.

In FIG. 2, C represents the mixed stream that exits the ISG at outlet 10. The center shaft 6 is cut off in this view but would extend to or through outlet 10. In this Figure, mixing elements 8–9 are shown indexed about 90° with respect to the view in FIG. 1. The size and orientation and number of mixers 8–9 can vary with the following limits: a pitch, P, to length, L, ratio of about 1 is required, the total width, W, in length L must be equal to the diameter, D, of tube 2, and the mixers 8–9 must be closely fit to shaft 6 to prevent extrusion of fluid through that interface 11.

A further innovation adapted to decrease the required length of the conduit and facilitate efficient mixing is achieved by forming the elements 8–9 in separate units. The use of involute mixer elements without a supporting shaft is known but they are a single unit twisted spirally and sometimes welded to the inner surface of tube 2. In such elements the original length of the tube is stretched along its outer surface (12 of FIG. 1) about 50 percent beyond its original length while the inner surface (11 of FIG. 1) is practically unstretched. The angle of spiral twist given each element 8 and 9 can vary but the combined effect should produce a twist in the fluid stream of around 90° as it flows over the elements 8–9. However, by adapting the separated structural arrangement of the Figures for use with the shaft 6 in a static mixer of this invention, it is possible to reduce the stretch of the elements. It is only required to have a slight stretch in outer surface 12 of each element 8 and 9, thereby forming structurally stronger elements even if the elements are formed of thin flexible material. Moreover, since the welds of this invention occur at surface 11, the unstretched area, as opposed to welding at 12, the weakened area, there is less danger of separation or fatigue during use and the elements withstand the pressures of flow much better. If strength is not essential it is possible to form the unit 8–9 as a single unit by punching out a center hole to receive shaft 6; and it is possible to weld to the tube 2 and friction fit the elements on shaft 6; or friction fit all elements of the static mixer.

It is sometimes desirable with very viscous materials to provide a step on each mixer (on either 8 or 9) to prevent rotation on shaft 6. Such a step could consist of a small appendage along one end of surface 11.

The materials of construction of the elements 8–9 are determined primarily by the viscosity of the materials to be mixed. A malleable and ductile metal is preferred for durability and sanitary reasons but other materials like plexiglass, plastic, wood, concrete, etc., can be used. Likewise, the size of the elements, length, width and thickness are of no consequence to the invention and are determined solely by the quantities of materials to be mixed. Similarly, tube 2 and shaft 6 can be any of the listed materials but are preferably metal such as aluminum or steel.

While the Figures indicate only one mixer, two, three or more are possible and preferred. In many cases involving low viscosity materials a few mixers can be used; likewise, it can be increased for higher viscosities. When several mixer elements 8–9 are placed in a tube they should be in abutting relationship to each other and should preferably be indexed at 20°–160° with respect to each other (as illustrated in combined consideration of FIGS. 1–2 with a 90° index angle). Such variations are within the skill of the art and clearly vary according to the particular materials mixed.

An important feature of this invention results from the pitch to length ratio shown. By having a ratio of about 1 it is possible to drastically reduce the length of the tube 2 (mixer). If elements 8–9 were arranged in abutting relationship rather than in adjacent relationship the length would be increased twofold and the pitch to length ratio would be 2. Likewise, if the elements were abutting but indexed at an angle to each other the pitch to length ratio would be between 1–2 and the length increased a like multiple.

The invention is illustrated in an aluminum tube of 2-inch diameter by 12 inches in length, having a ⅛ inch shaft centered therein and fitted with two 1-inch inlet pipes and a 2 inch outlet. Within the frame are arranged mixing elements in abutting relationship each indexed at about 90° to its predecessor. Each element is formed of aluminum ribbons about 15/16 inches wide by 3 inches long by 1/32 inches thick, twisted spirally through an angle of 90° and welded to the center shaft.

A highly viscous stream of an aqueous saline solution of acrylonitrile copolymer and a red pigmented stream of a similar copolymer can be pumped into the inlet of the tube at a combined feed rate of 100 lbs/hr and a substantially uniformly colored stream can be recovered.

It is also possible to mix reactive and/or heat sensitive components to mix more than two incoming streams and to mix liquids, solids, and gases in any combinations.

I claim

1. In a stationary mixer having no movable parts comprising a hollow cylindrical tube and at least one mixer element therein; the improvement which comprises a spirally twisted sheet-like mixer element placed in the tube wherein said mixer element consists of two separate spirally twisted sheet-like units mounted on a shaft wherein the combined width of said units is equal to the diameter of the tube and the combined length is about equal to the pitch of the mixing element and the edges of said element extend to the tube walls throughout the length of the element, said element being mounted on a shaft which extends longitudinally through the tube, and said element having a pitch to length ratio of about 1.

2. A stationary mixer having no movable parts comprising a hollow cylindrical tube and a plurality of mixer elements longitudinally mounted in abutting relationship therein, each of said mixer elements comprising a spirally twisted sheet-like mixer element placed in the tube, the edges of said elements extending to the tube walls throughout the length of the elements, said elements being mounted on a shaft which extends longitudinally through the tube, and said elements having a pitch to length ratio of about 1.

3. A stationary mixer having no movable parts comprising a hollow cylindrical tube and a plurality of mixer elements longitudinally mounted therein each of said mixer elements comprising a spirally twisted sheet-like mixer element placed in the tube, the edges of said elements extending to the tube walls throughout the length of the elements, said elements being mounted on a shaft which extends longitudinally through the tube, and said elements having a pitch to length ratio of about 1, wherein the leading edge of each element is positioned at an angle of rotation around the mounting shaft of from 20° to 160° with respect to the leading edge of the preceding element.

4. The mixer of claim 1 wherein a plurality of mixer elements are longitudinally mounted in said tube.

5. The mixer of claim 1 wherein the shaft is a closed shaft.

* * * * *